United States Patent [19]

Harrison

[11] Patent Number: 5,051,768
[45] Date of Patent: Sep. 24, 1991

[54] ELECTRONIC FLASH APPARATUS FOR REDUCING THE INCIDENCE OF HUMAN EYELID CLOSURES DURING EXPOSURE

[75] Inventor: George C. Harrison, Chelmsford, Mass.

[73] Assignee: Polaroid Corporation, Cambridge, Mass.

[21] Appl. No.: 498,767

[22] Filed: Mar. 26, 1990

[51] Int. Cl.⁵ .............................................. G03B 7/00
[52] U.S. Cl. .................................................. 354/415
[58] Field of Search ............... 354/415, 137, 129, 132, 354/138

[56] References Cited

U.S. PATENT DOCUMENTS

| | | | |
|---|---|---|---|
| 3,173,347 | 3/1967 | Stimson et al. | 354/415 |
| 4,299,464 | 11/1981 | Cushman | 354/137 |
| 4,357,083 | 11/1982 | Johnson et al. | 354/415 |
| 4,839,686 | 6/1989 | Hosomizu et al. | 354/416 |

Primary Examiner—L. T. Hix
Assistant Examiner—David M. Gray

[57] ABSTRACT

Electronic flash apparatus is provided that is capable of reducing the incidence of eyelid closure of a subject during an exposure interval when the subject is illuminated with visible light from the electronic flash apparatus immediately prior to the exposure interval. The electronic flash apparatus includes a visible light flash tube and an electrical circuit coupled thereto for controlling flash tube energization and de-energization immediately prior to and during an exposure interval. The electrical circuit includes apparatus for coupling the flash tube to a suitable source of electrical energy and for applying a trigger signal to the flash tube in order to illuminate the subject with a finite amount of visible light immediately prior to an exposure interval that will not cause the eyelids of the subject to blink in response thereto during the exposure interval.

8 Claims, 4 Drawing Sheets

ELECTRONIC FLASH APPARATUS FOR REDUCING THE INCIDENCE OF HUMAN EYELID CLOSURES DURING EXPOSURE

BACKGROUND OF THE INVENTION

1. Field of the Invention

The present invention relates to electronic flash cameras, in general, and to apparatus for avoiding the closure of an intended subject's eyelids during an exposure interval in response to visible light produced by the electronic flash in such a camera if the electronic flash is fired immediately prior to the exposure interval for range related purposes, in particular.

2. Description of the Prior Art

Photographic cameras having means for illuminating a subject to be photographed with infrared and/or visible light for range and/or reflectivity related purposes immediately prior to an exposure interval, have been disclosed in the prior art. In, for example, U.S. Pat. No. 4,357,083 to Johnson et al. a method and apparatus are described in which a subject to be photographed is illuminated with visible and non-visible radiation immediately prior to or at the early stages of an exposure interval. A signal representative of the non-visible radiation reflected from a subject to be photographed is employed, in part, for lens focusing purposes. While this arrangement is effective in determining subject distance, for example, the visible radiation illuminating the scene at these points in an exposure cycle often induces unwanted eyelid closures while a subject is being photographed.

This eyelid closure problem could be avoided by employing non-visible or infrared light at these points in an exposure cycle for subject distance determining purposes. In U.S. Pat. No. 3,173,347 to Stimson et al., a subject to be photographed is illuminated by two sources of artificial illumination at different times during an exposure cycle. One source illuminates a subject to be photographed with infrared light immediately prior to an exposure interval in order to derive a signal representative of subject distance and/or reflectivity for the purpose of automatically establishing an exposure aperture in response to this infrared light derived signal. The other source of light illuminates the subject to be photographed with visible light for photographic recording during the exposure interval. This arrangement avoids the problem of inducing eyelid closure mentioned above with respect to the Johnson et al. patent. However, the additional light source significantly increases the size and cost of photographic apparatus employing such an arrangement.

In U.S. Pat. No. 4,229,464 to Cushman, a method and apparatus are described for reducing the incidence of eye closures during the photographing of a human subject. A camera is used in combination with a visible light producing electronic flash and a delay mechanism for controlling the time when the camera shutter will open. The electronic flash is actuated to produce a pre-exposure flash of visible light in order to induce the eyes of the subject to blink. A delay period is also initiated in the camera's controls to delay opening of the camera's shutter. The duration of this delay is such that an exposure is not likely to be made until the refractory period after the evoked involuntary blink has been completed. The refractory period is that period of time after an eye has been stimulated with a first flash of visible light during which the eye is unable to react to a second flash of visible light. At the end of this delay period the shutter is allowed to open and a second flash may be generated to provide supplementary illumination. By delaying exposure until the refractory period immediately after a pre-exposure flash induced eyelid blink, the closure of an intended subject's eyelids during exposure from supplementary illumination is thereby reduced. While this arrangement is effective in reducing the incidence of eyelid closures during exposure, the delay in opening the shutter to produce an exposure interval may interfere with the camera's ability to photograph scenes that are only available during all or a portion of the delay period.

SUMMARY OF THE INVENTION

In accordance with a preferred embodiment of the present invention electronic flash apparatus is provided that is capable of reducing the incidence of eyelid closure of a subject during exposure when such a subject has been illuminated for a period of time by visible light from the electronic flash apparatus preliminary to an exposure interval. The electronic flash apparatus includes a main storage capacitor adapted to be charged from a suitable power source, a flash tube operable to discharge a portion of the electrical charge stored in said capacitor and trigger means for firing said flash tube. Means are provided for triggering the flash tube and for coupling the flash tube to the main storage capacitor to thereby cause a flash of light to be emitted therefrom in order to illuminate a subject to be photographed with a finite amount of visible light immediately prior to an exposure interval in a manner that will reduce the incidence of eyelid closure of the subject during the exposure interval.

It is a primary object of the present invention, therefore, to provide an electronic flash camera that is capable of reducing the incidence of eyelid closure of a subject to be photographed when illuminated by visible light from the electronic flash immediately prior to an exposure interval.

It is another object of the present invention to provide electronic flash apparatus for illuminating a subject with visible light immediately prior to an exposure interval, for subject distance determining purposes, which can be actuated to produce such a determination within a shorter period of time than was heretofore possible.

It is a further object of the present invention to provide electronic flash apparatus whose light emitting flash tube can be fired at a substantially higher flash rate than was heretofore possible.

Other objects, features and/or advantages of the present invention will be readily apparent from the following detailed description of a preferred embodiment thereof when taken in conjunction with the accompanying drawings.

DETAILED DESCRIPTION OF THE PREFERRED EMBODIMENT

Figure 1:
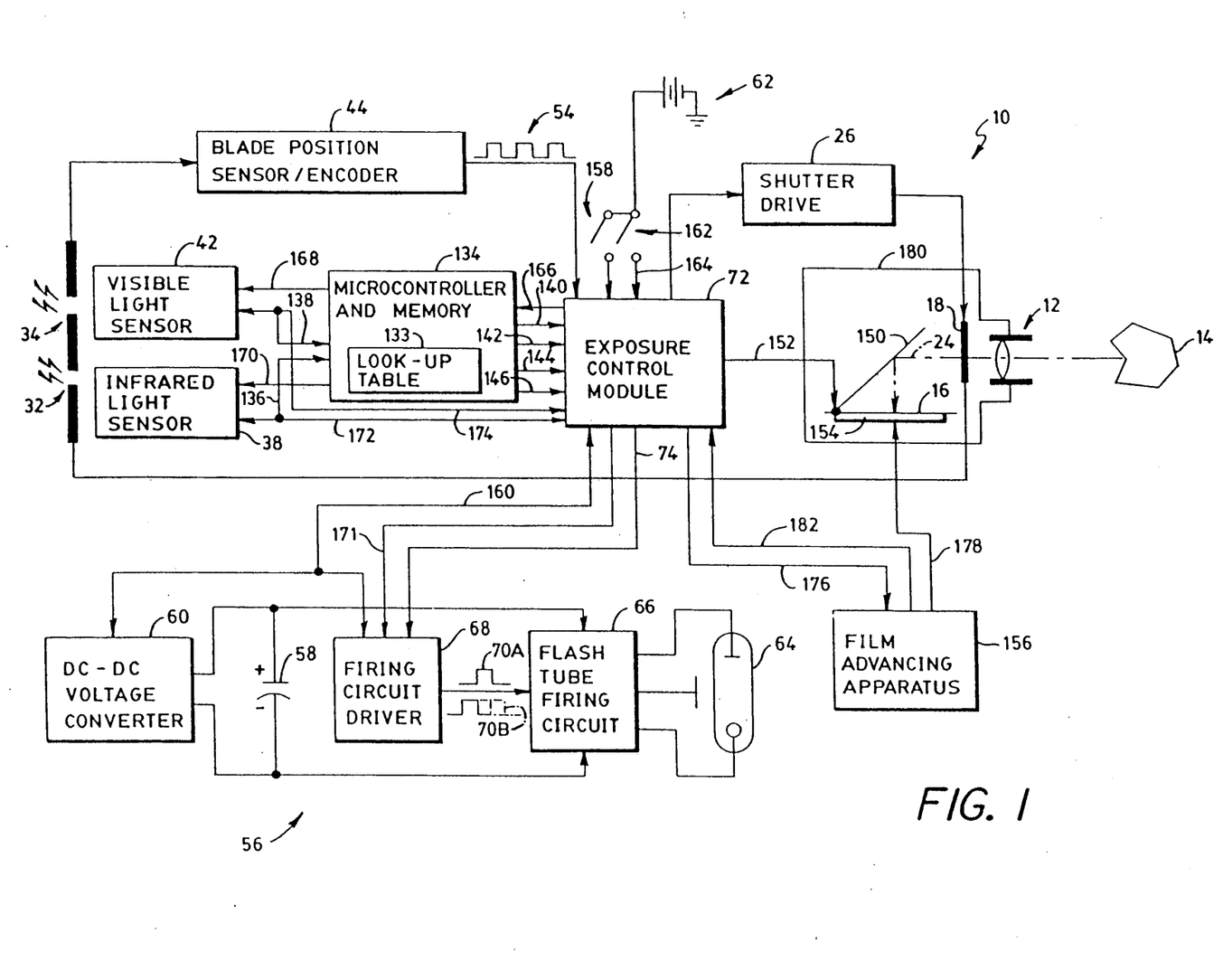
FIG. 1 is a schematic diagram of an electronic flash camera which incorporates a preferred embodiment of the electrical circuit for controlling the energization and de-energization of a flash tube forming a part of the electronic flash camera of the present invention.

Referring now to the drawings, and specifically to FIG. 1, there is shown a single lens reflex (SLR) electronic flash camera 10, of the self-developing type, which incorporates a preferred embodiment of an electrical circuit for controlling the light output of the electronic flash thereof immediately prior to an exposure interval for range or subject distance related reasons in a manner that will minimize electronic flash induced eyelid closure of a subject to be photographed during the exposure interval. The camera 10 includes an objective or taking lens 12 that may include one or more elements (only one shown) for focusing image-carrying light rays of, for example, an object 14 on a film plane 16 through an aperture formed in a shutter blade mechanism or assembly 18.

Figure 2A:
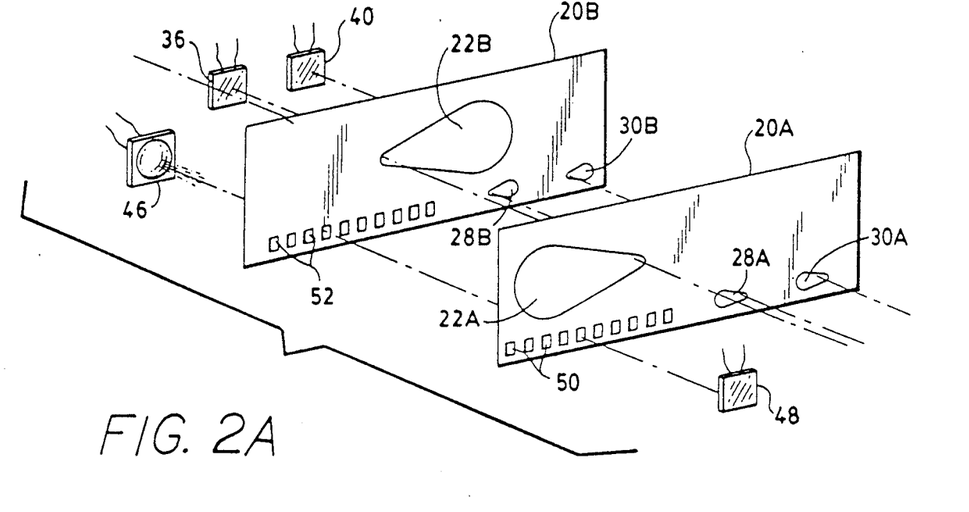
FIG. 2A is an exploded perspective view of a scanning type shutter blade mechanism which is also schematically shown in FIG. 1.
Figure 2B:
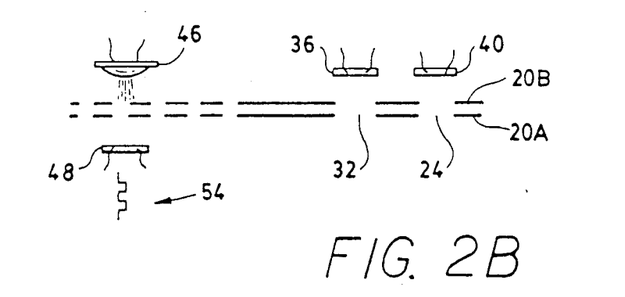
FIG. 2B is an unexploded top view, partly in sections, of the shutter blade mechanism of FIG. 2A.

With additional reference to FIGS. 2A and 2B, the blade mechanism 18, positioned intermediate the lens 12 and the film plane 16, includes a pair of overlapping shutter blade elements 20A and 20B of the "scanning" type. Scene light admitting primary aperatures 22A and 22B, are respectively provided in the blade elements 20A and 20B to cooperatively define a progressive and predictable variation of effective aperture openings in accordance with simultaneous displacement of one blade element with respect to the other blade element in a manner more fully described in commonly assigned U.S. Pat. No. 3,942,183 to Whiteside, now specifically incorporated herein by reference. The blade element apertures are selectively shaped so as to overlay the central optical axis 24 of the lens 12 thereby defining a gradually varying effective aperture size as a function of the position of the blades of the blade mechanism 18. A shutter drive 26 is provided for displacing the blade elements 20A and 20B of the blade mechanism 18. The shutter drive 26 includes a tractive electromagnetic device in the form of a solenoid (not shown) employed to displace the shutter blade elements with respect to one another in a manner more fully described in the above-cited Whiteside patent.

Each of the blade elements 20A and 20B of the blade mechanism 18 includes two secondary apertures 28A, 30A and 28B, 30B, respectively. The aperture 28A in the blade 20A cooperates with the aperture 28B in the blade 20B to form an opening 32 and the aperture 30A in blade 20A cooperates with aperture 30B in blade 20B to form an opening 34 through the shutter mechanism 18. These cooperating secondary apertures may be configured to track in a predetermined corresponding relationship with respect to the scene light admitting primary apertures 22A and 22B. With the primary and secondary apertures being formed in the same blade element and therefore being mechanically coupled to one another, it is readily apparent that the secondary apertures can move in the same manner as the primary apertures when the blade elements 20A and 20B are displaced, in the above-described manner, with respect to one another. The amount of artificial light admitted to the film plane 16 through the primary apertures 22A and 22B is controlled by a signal generated by a combination of an infrared photosensitive element 36 and an integrator (not shown) within an infrared sensor 38 that senses and integrates a corresponding amount of infrared scene energy through the opening 32. The amount of ambient scene light admitted to the film plane 16 through these primary apertures is controlled by a signal generated by a combination of a visible light photosensitive element 40 and an integrator (not shown) within a visible light sensor 42 that senses and integrates a corresponding amount of visible ambient scene light, through the opening 34. An example of scanning blade elements having primary and secondary apertures that cooperate to control the amount of scene light admitted to a film plane is shown in U.S. Pat. No. 3,942,183, supra.

The camera 10 is provided with a blade position sensor/encoder 44. The sensor/encoder 44 senses the position of the blade elements 20A and 20B with respect to one another and generates a signal representative of the relative blade element position. The sensor/encoder 44 comprises a light emitting diode 46, a photosensor 48 spaced therefrom, and a plurality of slots or openings 50 and 52 formed in the blade elements 20A and 20B, respectively. The slots 50, 52 are rectangular in shape, are of uniform size and are equally spaced in a linear direction in their respective blade elements 20A and 20B. The slots 50, 52 are interposed between the light emitting diode 46 and the photosensor 48 such that they alternately block and unblock the transmission of light between these two components to thereby cause the photosensor 48 to generate one or more pulses 54 representative of the relative position of the blade elements 20A and 20B. The position of the blade element 20A with respect to the blade element 20B defines the size of the effective or taking aperture formed by the primary apertures 22A and 22B in the blade mechanism 18. Therefore, the relative position of the blade elements 20A and 20B represented by the pulse or pulses 54 is also a measure of the size of the effective or taking aperture formed by the primary apertures 22A and 22B. The size of the slots 50, 52 in respective blade members 20A and 20B is kept to a minimum, in the direction of blade member movement, in order to minimize any blade position errors between the actual size of an effective aperture formed by the primary apertures 22A and 22B and the relative blade position pulses 54 representative of the size of this particular aperture.

The camera 10 is also provided with an electronic flash apparatus 56 together with apparatus for controlling its energization in order to determined subject reflectivity for subject distance or range related reasons and to provide a portion of the exposure value required to illuminate a scene to be photographed. The electronic flash apparatus 56 comprises a main storage capacitor 58 which may be charged up to an operating voltage by any conventional voltage converter circuit (not shown) which would be included within a DC-DC voltage converter 60. The DC-DC voltage converter 60 operates in a conventional manner to convert a DC voltage as may be derived from a battery 62 of the camera 10, which can be in the order of 6 volts, to a suitable operating voltage such as 280 volts. A flash tube 64 of the electronic flash apparatus 56 is electrically coupled to the main storage capacitor 58 by a flash tube firing circuit 66. The details of the firing circuit 66 will be described below with respect to FIG. 3. The flash tube firing circuit 66 is, in turn, coupled to a conventional firing circuit driver 68 that generates both fixed and variable width pulses, such as the pulses 70A and 70B, respectively, that control when and for how long the flash tube 64 illuminates a subject to be photographed with visible light. The firing circuit driver 68 is actuated by a camera operator initiated signal from an exposure control module 72 on a path 74. The flash tube firing circuit 66 will now be described in detail.

Figure 3:
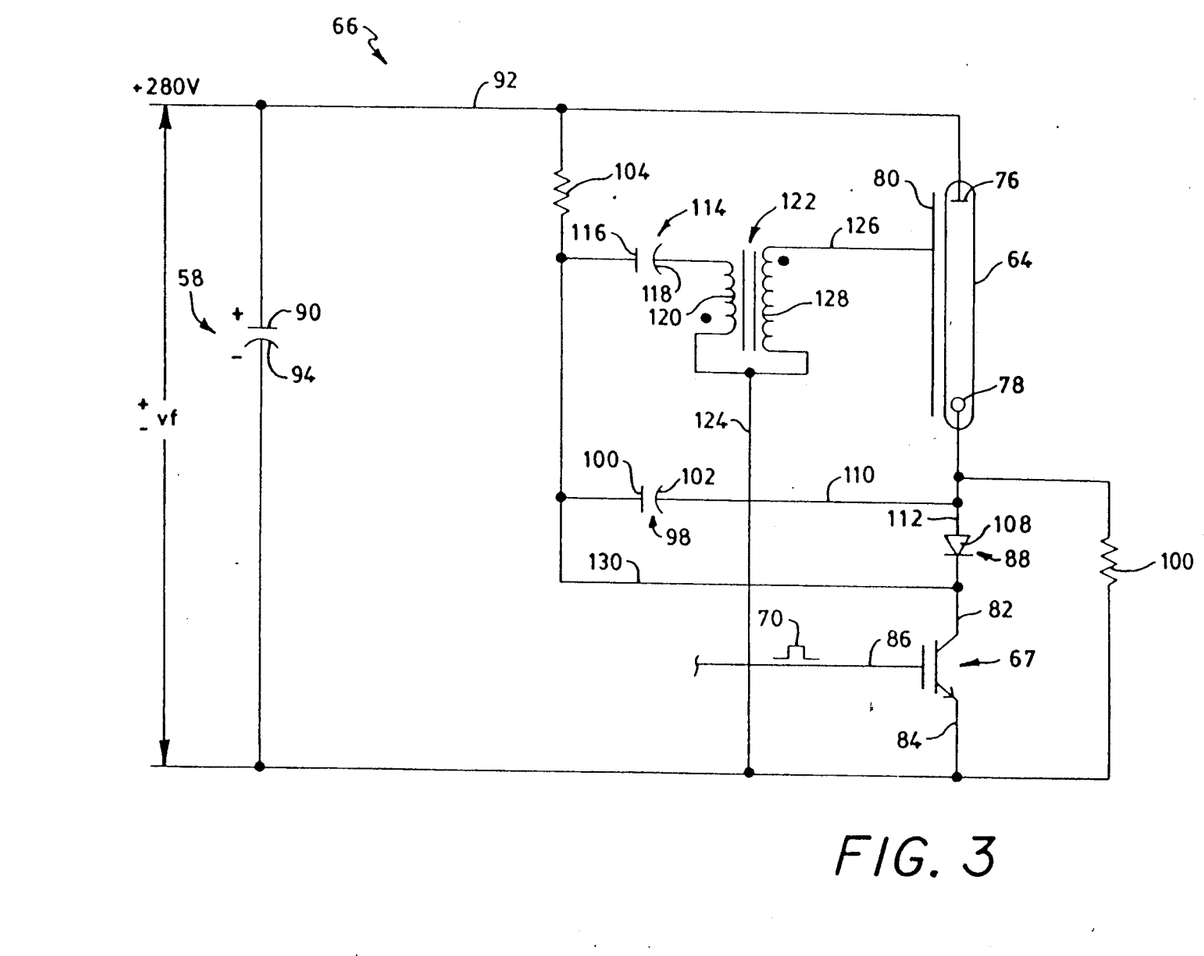
FIG. 3 is a detailed schematic diagram of an electrical circuit for controlling the light output of the flash tube in the electronic flash camera of FIG. 1.

As shown in FIG. 3, the flash tube firing circuit 66 includes the electronic flash tube 64 having an anode 76, a cathode 78 and a trigger electrode 80. The flash tube 64 is preferably a conventional flash tube having relatively high resistance. The firing circuit 66 also includes an insulated gate bipolar transistor or IGBT 67, such as that which is available from the Mitsubishi Electric Corporation of Tokyo, Japan, having a collector terminal 82, an emitter terminal 84 and a gate terminal 86. The cathode 78 of the flash tube 64 is connected to the collector terminal 82 of the transistor 67 through a blocking diode 88. The anode 76 of the flash tube 64 is connected to a positively charged electrode 90 of the main storage capacitor 58 through a path 92 and the emitter terminal 84 of the transistor 67 is connected to a negatively charged electrode 94 of the main storage capacitor 58 through a path 96.

A voltage doubler capacitor 98 is connected between the positively and negatively charged electrodes 90 and 94, respectively, of the main storage capacitor 58. The doubler capacitor 98 includes an electrode 100 and an electrode 102. The electrode 100 is connected to the positively charged electrode 90 of the main storage capacitor 58 through a resistor 104 and the path 92, and the electrode 102 is connected to the negatively charged electrode 94 of the main storage capacitor 58 through a charging resistor 106 and the path 96. In addition, the electrode 102 of the capacitor 98 is connected to an anode 108 of the diode 88 through a path 110 and a path 112.

A trigger capacitor 114 is also connected between the positively and negatively charged electrodes 90 and 94, respectively, of the main storage capacitor 58. The trigger capacitor 114 includes an electrode 116 and an electrode 118. The electrode 116 is connected to the positively charged electrode 90 of the main storage capacitor 58 through the resistor 104 and the path 92 and the electrode 118 is connected to the negatively charged electrode 94 of the main storage capacitor 58 through a primary winding 120 of a step-up transformer 122, a path 124 and the path 96. The trigger electrode 80 of the electronic flash tube 64 is connected to the negatively charged electrode 94 of the main storage capacitor 58 through a path 126, a secondary winding 128 of the step-up transformer 122, the path 124 and the path 96.

The flash tube 64 is activated to illuminate a scene to be photographed with visible light in the following manner. Prior to the activation of the flash tube 64, the DC-DC voltage converter 60 charges the main storage capacitor 58 to a voltage level of approximately 280 VDC. The main storage capacitor electrode 90 is charged positively and the main storage capacitor electrode 94 is charged negatively with respect to the electrode 90 by the voltage converter 60. With the voltage doubler capacitor 98 and the trigger capacitor 114 being connected across the main storage capacitor 58 in the above-described manner, these capacitors are also charged to 280 VDC. Electrodes 116 and 118 of the trigger capacitor 114 are changed positively and negatively, respectively, and the electrodes 100 and 102 of the voltage doubler capacitor 98 are also charged positively and negatively, respectively.

When, for example, a particular camera operator initiated signal from the exposure control module 72 is applied to the firing circuit driver 68 through the path 74, a flash firing command in the form of a thirty-five microsecond pulse, such as the pulse 70A, is generated at the output thereof and then applied to the gate terminal 86 of the IGBT 67. The IGBT 67 conducts when the flash firing command pulse is in its high or ON state to thereby couple the electrodes 100 and 116 of the capacitors 98 and 114, respectively, to the electrode 94 of the main storage capacitor 58 through the path 96. As is well known, voltage on a capacitor cannot change instantaneously. Therefore, when the IGBT 67 conducts, the flash tube 64 has +280 VDC applied to its anode 76 from the electrode 90 of the main storage capacitor 58 and −280 VDC from the electrode 102 of the capacitor 98 for a total of 560 VDC between the anode 76 and the cathode 78. The doubler capacitor 98, in effect, instantaneously doubles the voltage across the flash tube 64 over what it would have been when the IGBT conducted, absent such a capacitor. In addition, a blocking diode that becomes reversed bias when the −280 VDC is applied to the cathode 78, prevents this voltage from interfering with the conduction of the IGBT 67.

At the same time that the IGBT 67 causes the capacitor 98 to double the voltage across the flash tube 64, it also causes the trigger capacitor 114 to apply the +280 VDC stored therein to the primary winding 120 of the step-up transformer 122 through a path 130 and the path 124. This +280 VDC is increased or stepped-up to approximately 4K VDC and is then applied to the trigger electrode 80 of the flash tube 64 where it initiates or triggers the firing thereof in accordance with the conventional polarity dot markings on the windings 120 and 128 of the transformer 122 as shown in FIG. 3.

At the end of thirty-five microseconds, the firing circuit driver 68 automatically causes the flash firing command to change from its high or ON state to its low or OFF state, without any external or outside control, to thereby terminate the pulse 70A being applied to the terminal 86 of the IGBT 67. The flash firing command OFF state causes the IGBT to change from its conducting to its non-conducting state and thereby interrupt current flow through the flash tube 64 and extinguish the light output therefrom. When the IGBT 67 is turned off, the doubler capacitor 98 and the trigger capacitor 114 are once again charged to the level of the main storage capacitor 58, in the above-described manner. By automatically turning off the IGBT 67 a fixed period of time after it is turned on to activate the flash tube 64 for scene illumination, the IGBT 67 control system can be made substantially less complicated than that described in, for example, U.S. Pat. No. 4,839,686 to Hosomizu et al.

Figure 4:
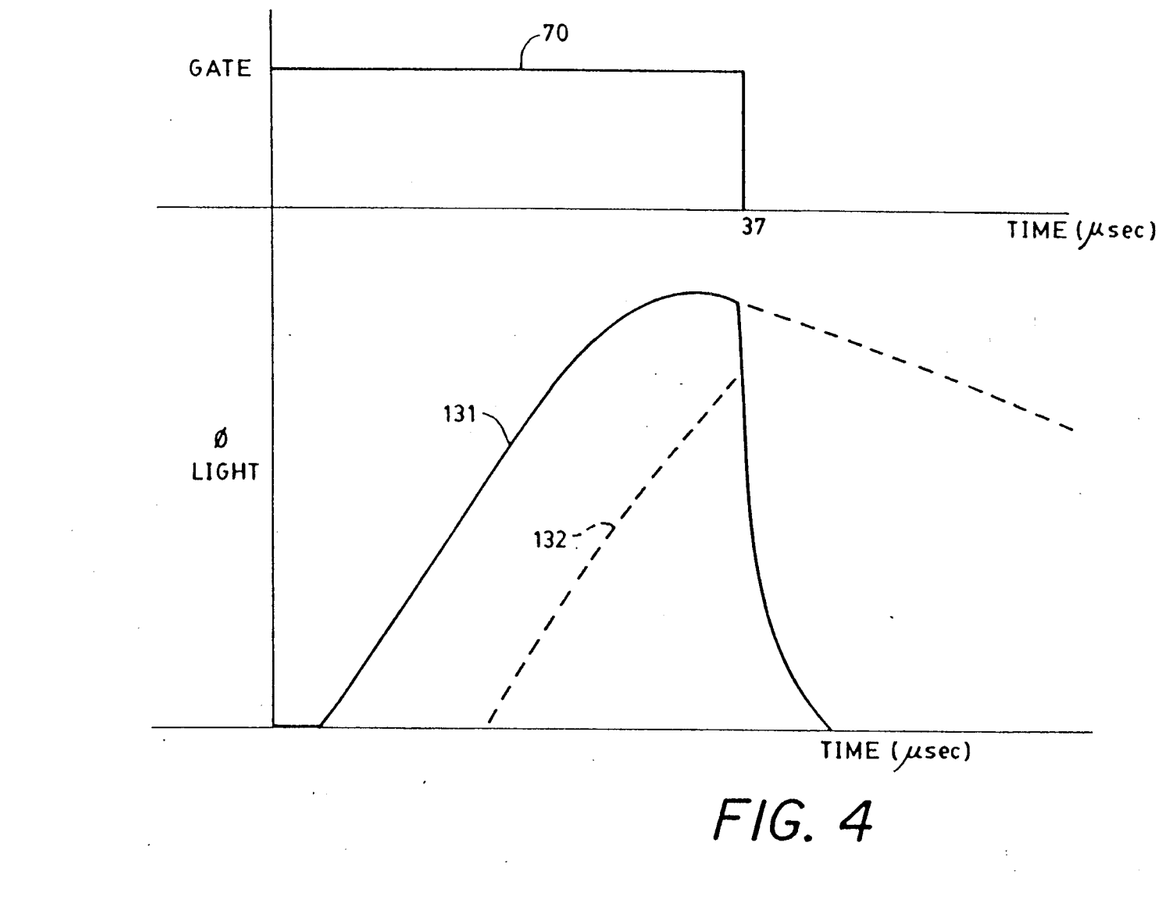
FIG. 4 is a graph of an IGBT trigger signal and the IGBT response thereto as a function of time.

It should be noted that several factors control the period of time that it takes to actually fire an electronic flash tube once an appropriate trigger signal has been applied to its trigger electrode. Among these factors is the magnitude of the voltage that is applied between the anode and cathode of the flash tube at the time that the trigger signal is so applied. The greater this voltage magnitude the earlier or sooner will be the firing of the flash tube. As shown in FIG. 4, in the flash tube firing circuit of the present invention once the flash firing command pulse, such as the pulse 70A, is applied to the gate terminal 86 of the IGBT 67, the flash tube 64 begins to fire within approximately two microseconds thereafter. This two microsecond delay is represented by the curve 131 in FIG. 4. If the voltage doubler capacitor 98 was not included within the flash tube firing circuit 66 as shown in FIG. 3, 280 VDC and not 560 VDC would be applied between the anode 76 and the cathode 78 of the flash tube 64. This would cause a delay of approximately twelve microseconds instead of two microseconds before the flash tube 64 began to fire, once the above-described flash firing command has been applied to the gate terminal 86 of the IGBT 67 as shown by the curve 132 in FIG. 4.

The camera 10 additionally includes an empirically derived look-up table 133 within a microcontroller and memory 134. The primary purpose of the look-up table 133 is to control the amount of image-carrying scene light rays focused on the film plane 16 by the lens 12 through the effective or taking aperture in the blade mechanism 18 formed by the primary apertures 22A and 22B, as a function of ambient or visible scene light and of subject reflectivity.

As previously explained, the amount of artificial and ambient scene light transmitted to the film plane 16 is indirectly measured by sensing a portion of the artificial and ambient scene light through the openings 32 and 34 in the blade mechanism 18 with photosensors 36 and 40 and their associated integrators located within the infrared sensor 38 and the visible light sensor 42, respectively. A signal generated by the infrared sensor 38 and its associated integrator, which is subject distance related and a measure of subject reflectivity, is routed to the look-up table 133 through a path 136 and a signal generated by the visible light sensor 42 and its associated integrator representative of ambient scene light is routed to the look-up table 133 through a path 138. The look-up table 133 generates a plurality of different signals in response to these two signals for controlling the amount of image-carrying light rays transmitted to the film plane 16 through the primary apertures in the blade mechanism 18. These plurality of different signals are derived for each exposure cycle, prior to an exposure interval. As an alternative, these signals may also be derived in the early stages of an exposure interval.

The signals derived by the look-up table 133 are (1) an aperture size signal that controls the size of the taking aperture formed by the primary apertures 22A and 22B at which the flash tube 64 is fired during an exposure interval on an output path 140; (2) a percentage of artificial light signal that controls the amount of artificial light to be added to the scene to be photographed by the flash tube 64 on an output path 142; (3) a percentage of ambient light signal that controls the amount of image-carrying light to be admitted to the film plane 16 through the primary apertures 22A and 22B in the blade mechanism 18, on an output path 144; and (4) a signal to terminate the exposure interval at a time dependent upon the magnitude of the artificial and ambient light signals appearing on the input paths 136 and 138, respectively, to the look-up table 133, if the exposure interval is not sooner terminated, on an output path 146.

Prior to the generation of the above-noted look-up table output signals on the paths 140, 142, 144 and 146, the ambient light signal generated by the visible light sensor 42 is routed to the microcontroller and memory 134 through the path 138 for temporary storage therein. Subsequent to the storage of the ambient light signal in the microcontroller and memory 134 and prior to the start of an exposure interval, a signal representative of the infrared light sensed by the infrared light sensor 38 reflected from a scene subject previously illuminated by a wink or short duration flash of light from the electronic flash 64 containing both visible and infrared light, is routed to the microcontroller and memory 134 through the path 136. The stored ambient light signal and this subsequently generated infrared light signal are collectively employed by the look-up table 133 to generate the above-noted signals appearing on the output paths 140, 142, 144 and 146 of the microcontroller and memory 134.

The signals appearing at the output paths 140, 142, 144 and 146 of the microcontroller and memory 134 in response to the infrared and ambient scene light signals respectively generated by the sensors 38 and 42 are empirically determined. The look-up table 133 is constructed in accordance with the subjective analysis of a multiplicity of photographic images of subjects at various distances having a range of reflectivities that are formed under a wide range of artificial and ambient scene lighting conditions, in order to produce these signals.

In general, when forming a photographic image at the film plane 16 of the camera 10, the smaller the taking aperture formed by the primary apertures 22A and 22B, the greater will be the depth of field of the lens 12 and the darker will be the ambient scene exposure level because of the reduction in image-carrying scene light caused by the smaller taking aperture. The look-up table 133 is constructed such that it performs a tradeoff between the sharpness of a subject within the scene and the ambient scene exposure. In performing this tradeoff, the look-up table 133 causes the electronic flash 64 to fire at the smallest possible taking aperture, and therefore the greatest depth of field, that will provide the optimum sharpness of a subject within a scene and overall scene exposure in response to the artificial and ambient scene light level signals generated by the sensors 38 and 42 by controlling the amount of artificial light generated by the scene-illuminating electronic flash 64 and by controlling the maximum size of the taking aperture formed by the primary apertures 22A and 22B.

As noted above, the camera 10 is of the SLR type and therefore includes a conventional reflex mirror 150 that is actuatable by the exposure control module 72 through a path 152. The mirror 150 is actuatable, in a conventional manner, between a viewing position where it blocks the transmission of scene light to the film plane 16 and where a camera operator can view a scene to be photographed through the lens 12, and a taking or unblocking position as shown in FIG. 1, where it facilitates the transmission of scene light to the film plane 16 during an exposure interval.

The camera 10 is preferably designed for use with a self-developing film unit (not shown) similar to those described in U.S. Pat. No. 3,415,644 to Land, in common assignment herewith, and specifically incorporated herein by reference. The self-developing film unit is packaged in a light-tight film cassette 154 which is shown, in FIG. 1, in the condition assumed just after it has been fully inserted into the camera 10. The cassette 154 may enclose the 6 VDC battery 62.

Mounted within the camera 10 is a film advancing apparatus 156 similar to that described in U.S. Pat. No. 3,753,392 to Land that includes a motor for operating a gear train (neither shown) which is coupled with the film advancing apparatus 156 to provide for the continuous movement of an exposed film unit from an exposure position within the camera 10 toward the exterior thereof. The film advancing apparatus 156 additionally includes a film-engaging arm member (not shown) driven by the above-mentioned motor and gear train. The arm member is adapted to extend into a slot in the cassette 154, as shown in the above-noted Land '392 patent, and engage the uppermost film unit located therein at or near its trailing edge prior to moving it out of the cassette 154 and into the bite of a pair of conventional processing rollers (not shown) mounted adjacent the leading edge of the above-mentioned uppermost film unit. The processing rollers, which are rotated by the motor and gear train mentioned above continue the uninterrupted movement of the exposed film unit toward the exterior of the camera 10 while simultaneously rupturing a container of processing liquid at the leading of the exposed film unit. The processing rollers spread the liquid contents of the ruptured container between elements of the film unit to initiate formation of a visible image within the film unit in a manner that is well-known in the art.

OPERATION

A typical exposure cycle will now be described in detail. For the purpose of this description it is assumed that the taking aperture of the blade mechanism 18 is in its full open position, that the openings 32 and 34 formed by the secondary apertures in the blade mechanism 18 are also fully opened, that the mirror 150 is in its viewing or light blocking position, that the flash apparatus 56 has been energized by the prior closure of a switch 158 that coupled the battery 62 to the DC-DC voltage converter 60 through the exposure control module 72 and a path 160 and that the main storage capacitor 58, the voltage doubler capacitor 98 and the trigger capacitor 114 are fully charged and ready for the initiation of an exposure cycle.

With reference to FIGS. 1, 2A, 2B, 3 and 4 of the drawings, a switch 162 is actuated to its closed position by a camera operator to initiate the exposure cycle. The closure of the switch 162 couples the battery 62 to the exposure control module 72 through a path 164. With the blade mechanism opening 34 formed by the secondary apertures 30A and 30B adjacent the visible light sensor 42 in its full open position, the exposure control module 72 and the microcontroller and memory 134 coupled thereto through a path 166, in turn, enable the visible light sensor 42 through a path 168 to integrate ambient scene light to a predetermined level and then send the integrated value to the look-up table 133 within the microcontroller and memory 134 through the path 138 for temporary storage.

The exposure control module 72 then energizes the shutter drive 26 to actuate the blade mechanism 18 and therefore the taking aperture together with the opening 32 formed by the secondary apertures 28A and 28B and the opening 34 formed by the secondary apertures 30A and 30B to their fully closed positions. Subsequent to closing the opening 32 and prior to the initiation of an exposure interval, the shutter drive 26 causes the opening 32 to increase in size toward its fully opened position. While the opening 32 is being moved toward its fully opened position, the exposure control module 72 actuates means (not shown) for moving the mirror 150 from its viewing or light blocking position, where it precludes the transmission of image-carrying light rays to the film plane 16, to its light unblocking position (as shown in FIG. 1), where it facilitates the transmission of image-carrying light rays to the film plane 16 during an exposure interval. When the opening 32 adjacent the infrared light sensor 38 is in its fully open position the exposure control module 72 commands the firing circuit driver 68 through the path 74 to produce a thirty-five microsecond pulse 70A at its output and at the input to the flash tube firing circuit 66. The flash tube firing circuit 66 in response thereto causes the flash tube 64 to illuminate the scene to be photographed with a thirty-five microsecond pulse of visible and infrared light in the previously described manner. This thirty-five microsecond illumination of the scene constitutes a first pulse of light directed toward the scene to be photographed.

In addition to causing the illumination of the scene for thirty-five microseconds prior to the initiation of an exposure interval, the exposure control module 72 enables the integrator within the infrared sensor 38 through a path 170 during this same period of time and then causes the integrated value, which constitutes a measure of subject reflectivity, to be sent to the look-up table 133 within the microcontroller and memory 134 through the path 136. Upon receipt of this subject reflectivity signal, the look-up table 132 combines it with the ambient light or scene brightness signal previously stored in the microcontroller 134. These combined signals are then employed to generate the aperture size flash fire signal, the percentage of artificial light signal, the percentage of ambient light signal and the end of exposure signal subsequently appearing on the microcontroller 134 output paths 140, 142, 144 and 146, respectively, that are, in turn, applied to the exposure control module 72. Upon receipt of these look-up table generated signals, the exposure control module 72 actuates the shutter drive 26 and the blade mechanism 18 coupled thereto such that the opening 32 formed by the secondary apertures 28A and 28B is placed in its fully closed position and then actuates the shutter drive 26 and the blade mechanism 18 to initiate an exposure interval. The exposure control module 72 includes four conventional comparators (not shown) to determine when the four conditions represented by the microcontroller 134 output signals on the paths 140, 142, 144 and 146 and employed in the generation of an exposure interval have been achieved. An exposure interval is defined therein as the period of time that the shutter mechanism 18 allows image-carrying light rays collected by the lens 12 to reach the film plane 16.

The first of the above-mentioned comparators compares the reference or desired aperture size flash fire signal on microcontroller output path 140 with the actual blade position signal and therefore the taking aperture size as represented by the pulses 54 from the blade position sensor/encoder 44. When this first comparator determines that these two signals are equal, the exposure control module 72 sends a flash fire ON command on a path 171 to the firing circuit driver 68 that, in turn, causes the flash tube firing circuit 66 to activate the flash tube 64 in the above-described manner to thereby illuminate the scene being photographed with light containing both visible and infrared light, during the exposure interval.

The second of the above-mentioned comparators compares the reference or desired percentage of artificial light signal on microcontroller output path 142 with the actual level of artificial light illuminating the scene as sensed by the infrared light sensor 38 during the exposure interval which is routed to the exposure control module 72 through a path 172. When this second comparator determines that these two signals are equal, the exposure control module 72 sends a flash fire OFF command on the path 171 to the firing circuit driver 68 that, in turn, causes the flash tube firing circuit 66 to extinguish the light output of the flash tube 64, also in the above-described manner. This illumination of the scene with artificial light constitutes a second pulse of light that is directed toward the scene to be photographed.

The third of the above-mentioned comparators compares the reference or desired percentage of visible light signal on microcontroller output path 144 with the actual level of visible light illuminating the scene as sensed by the visible light sensor 42 that is routed to the exposure control module 72 through the path 174. When this third comparator determines that these two signals are equal, the exposure control module 72 actuates the shutter drive 26 to close the taking aperture in the blade mechanism 18 and thereby terminate the exposure interval.

Under certain scene lighting and subject reflectivity conditions there may be insufficient ambient and/or artificial scene light reflected from the scene for infrared light sensor 38 and/or the visible light sensor 42 to generate a signal that is capable of causing the exposure control module 72 to terminate an exposure interval in a reasonable amount of time. A fourth comparator arrangement is provided to overcome this problem. This fourth comparator compares a signal on the microcontroller output path 146 representative of the level of ambient and/or scene light reflected from the scene with a predetermined reference signal stored within the exposure control module 72. If the signal on the path 146 is greater than the reference signal, the exposure interval will be limited to a relatively short period of time such as 40 milliseconds and if it is less than the reference signal, the exposure interval will be limited to a relatively long period of time such as 400 milliseconds unless terminated sooner by the presence of greater levels of ambient and/or artificial scene light.

At the completion of the exposure interval, the exposure control module 72 actuates the mirror 150 towards its light-blocking position, and actuates the film advancing apparatus 156 and the drive motor (not shown) included therein, through a path 176, to initiate the transport and processing of an exposed, self-developing film unit. The film advancing apparatus 156, in turn, moves the exposed film unit located in the cassette 154, through a path 178, into the bite of the pair of adjacent processing rollers (not shown), in the manner described above, to spread processing liquid between certain film layers and to move the exposed film unit into an exit slot (not shown) in a housing 180 of the self-developing camera 10. After the mirror 150 has been actuated to its light blocking position where it precludes the passage of light to the film plane, the exposure control module 72 actuates the shutter drive 26 and the shutter mechanism 18 coupled thereto such that the primary or taking aperture thereof is placed in its fully opened position. After the film advancing apparatus 156 has moved the exposed film unit through the above-mentioned pair of rollers, a film movement completion signal is routed to exposure control module 72 through a path 182 and then to the microcontroller 134 coupled thereto through the path 166. Upon receipt of this film movement completion signal, the exposure control module 72 initiates the charging of the electronic flash apparatus 56 through the path 160. When the main storage capacitor 58 of the electronic flash apparatus 56 is fully charged, as sensed through the path 160, the exposure control module 72 places the exposure control system of the camera 10 in condition for the initiation of the next exposure cycle.

In the exposure control system described above, a source of artificial light generated by the flash tube 64 was employed to illuminate the scene with both visible and infrared light. The flash tube 64 illuminates the scene twice during an exposure cycle, once before and once during an exposure interval. Both the visible and infrared light were employed for exposure control during an exposure interval. However, only the infrared light from the flash tube 64 was employed for exposure control immediately prior to or at the early stages of the exposure interval. By firing the flash tube 64 twice and utilizing the infrared portion of the illumination generated thereby in the determination of subject reflectivity before an exposure interval, only a single source of illumination is required. It should be noted, however, that exposure interval and pre-exposure interval illumination could be provided with two separate light sources. One source would be that provided by the flash tube 64 to generate both visible and infrared light and would be employed during the exposure interval. The other source would only have to emit infrared light prior to an exposure interval and therefore an infrared light emitting diode, for example, could be employed for such purposes.

From the foregoing description of the invention it will be apparent to those skilled in the art that various improvements and modifications can be made in it without departing from its true scope. The embodiment described herein is merely illustrative and should not be viewed as the only embodiment that might encompass the invention.

What is claimed is:

1. An exposure control system for photographic apparatus comprising:

an electronic flash for illuminating a human subject within a scene to be photographed with light having at least visible light components;

a blade mechanism that defines an exposure aperture, said blade mechanism being mounted for movement between a blocking arrangement in which said blade mechanism is in light blocking relation with respect to an optical path so as to preclude scene light from being transmitted along the optical path to a film plane and an unblocking arrangement in which said blade mechanism is in light unblocking relation with respect to the optical path so as to allow the passage of scene light to the film plane through said exposure aperture when said blade mechanism is actuated between its said light blocking and unblocking arrangements to produce an exposure interval; and control means for actuating said blade mechanism to generate said exposure interval and for actuating said electronic flash to illuminate the subject immediately prior to the exposure interval in order to evaluate certain subject characteristics, said pre-exposure illumination occurring totally within a period of time that is of a sufficiently short duration to render the subject's eyelids unable to blink in response thereto during the subsequent exposure interval.

2. The exposure control system of claim 1 wherein said electronic flash includes an anode, a cathode and a trigger electrode to which a trigger signal is applied to initiate light-generating current flow between said anode and cathode, and said control means includes a switching component in electrical series relation with said electronic flash that is actuatable between conducting and non-conducting states, said switching component being actuatable from its said conducting state to its said non-conducting state within said short duration period of time, after a trigger signal has been applied to said trigger electrode, to thereby interrupt light-generating current flow through said electronic flash between said anode and said cathode.

3. The exposure control system of claim 2 wherein said switching component is an insulated gate bipolar transistor.

4. The exposure control system of claim 3 wherein said insulated gate bipolar transistor includes a collector terminal and an emitter terminal, said transistor is actuatable between a conducting state where it enables the passage of said light-generating current between said collector terminal and said emitter terminal and a non-conducting state where it precludes such current passage, and said collector terminal is connected to said electronic flash cathode by a diode that prevents voltage variations on said electronic flash cathode, of a certain polarity, from affecting the operation of said insulated gate bipolar transistor when it is in its said conducting state.

5. The exposure control system of claim 1 wherein said electronic flash includes an anode, a cathode and a trigger electrode to which a trigger signal is applied to initiate firing of said electronic flash, and said control means includes means for doubling the magnitude of a selected voltage and applying this doubled magnitude voltage between said anode and said cathode immediately prior to or at the same time that a trigger signal is being applied to said trigger electrode to initiate electronic flash firing.

6. The exposure control system of claim 1 wherein said electronic flash includes an anode, a cathode and a trigger electrode to which a trigger signal is applied to initiate light-generating current flow between said anode and said cathode, and said control means includes an insulated gate bipolar transistor having a collector terminal and an emitter terminal that are in an electrical series relation with said anode and cathode that is actuatable between a conducting state where it enables the passage of said light-generating current between said collector terminal and said emitter terminal and a non-conducting state where it precludes such current passage, and said collector terminal is connected to said electronic flash cathode by a diode that prevents voltage variations on said electronic flash cathode, of a certain plurality, from affecting the operation of said insulated gate bipolar transistor when it is in its said conducting state.

7. An electronic flash camera having means for defining a film plane comprising:

a lens system for directing image-carrying light rays along an optical path from a scene onto photosensitive material located in the film plane;

an electronic flash for illuminating a human subject within a scene to be photographed with light having at least visible light components;

a shutter mechanism including an exposure aperture mounted for movement between a blocking arrangement in which it is in light blocking relation with respect to said exposure aperture and the optical path so as to preclude scene light from being transmitted along the optical path to the film plane and an unblocking arrangement in which is in light unblocking relation with respect to said exposure aperture and the optical path so as to allow the passage of scene light to the film plane when said shutter mechanism is actuated between its said light blocking and unblocking arrangements to produce an exposure interval; and control means for actuating said shutter mechanism to generate said exposure interval and for actuating said electronic flash to illuminate the subject immediately prior to the exposure interval in order to evaluate certain subject characteristics, said pre-exposure illumination occurring totally within a period of time that is of a sufficiently short duration to render the subject's eyelids unable to blink in response thereto during the subsequent exposure interval.

8. The electronic flash camera of claim 7 wherein said electronic flash includes an anode, a cathode and a trigger electrode to which a trigger signal is applied to initiate light-generating current flow between said anode and cathode, and said control means includes an insulated gate bipolar transistor having a collector terminal and an emitter terminal in an electrical series relation with respect to the anode and the cathode of said electronic flash, said transistor is actuatable between a conducting state where it enables the passage of said light-generating current between said electronic flash anode and cathode and between said collector terminal and said emitter terminal, and a non-conducting state where it precludes such current passage, said insulated gate bipolar transistor being actuatable from its said conducting state to its said non-conducting state within said short duration period of time, after a trigger signal has been applied to said trigger electrode, to thereby interrupt light generating current flow through said electronic flash between said anode and said cathode.

* * * * *